(12) United States Patent
Maeda

(10) Patent No.: US 11,819,998 B2
(45) Date of Patent: Nov. 21, 2023

(54) ARTICLE TRANSFER DEVICE

(71) Applicant: Ishida Co., Ltd., Kyoto (JP)

(72) Inventor: Shuichi Maeda, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 581 days.

(21) Appl. No.: 16/980,877

(22) PCT Filed: Feb. 21, 2019

(86) PCT No.: PCT/JP2019/006633
§ 371 (c)(1),
(2) Date: Sep. 15, 2020

(87) PCT Pub. No.: WO2019/181355
PCT Pub. Date: Sep. 26, 2019

(65) Prior Publication Data
US 2021/0016451 A1  Jan. 21, 2021

(30) Foreign Application Priority Data
Mar. 20, 2018 (JP) .................. 2018-052424

(51) Int. Cl.
B25J 13/02 (2006.01)
B65G 47/90 (2006.01)

(52) U.S. Cl.
CPC .......... B25J 13/02 (2013.01); B65G 47/905 (2013.01)

(58) Field of Classification Search
CPC ...... B25J 13/02; B25J 9/1679; B25J 11/0045; B25J 15/10; B25J 9/1612; B65G 47/905; G05B 2219/39514; G05B 2219/45111
See application file for complete search history.

(56) References Cited

U.S. PATENT DOCUMENTS

2007/0119125 A1    5/2007  Stenbom
2013/0200644 A1*   8/2013  Shiomi .................. B25J 9/1612
                                             901/31
2014/0252789 A1*   9/2014  Shiomi ................ B25J 15/0028
                                             294/213

FOREIGN PATENT DOCUMENTS

| CN | 2602608 Y | | 2/2004 |
| CN | 107108120 A | | 8/2017 |
| JP | H0326445 A | * | 2/1991 |
| JP | H0326445 A | | 2/1991 |
| JP | H06197718 A | | 7/1994 |
| JP | H077888 U | | 2/1995 |
| JP | H11332486 A | | 12/1999 |

(Continued)

OTHER PUBLICATIONS

English Translation for JPH0326445 (Year: 1991).*

(Continued)

Primary Examiner — Rachid Bendidi
(74) Attorney, Agent, or Firm — Studebaker & Brackett PC

(57) ABSTRACT

An article transfer device includes: a robot hand transferring an article gripped by a gripping unit; and a control unit controlling operation of the robot hand so as to insert the gripping unit into an article region where the article is disposed, grip the article, and transfer the gripped article to a transfer destination. The control unit controls the operation of the robot hand such that the gripping unit is closed and a predetermined amount of the article is gripped after opening-closing operation for opening the gripping unit after temporarily closing the gripping unit is executed at least once.

5 Claims, 5 Drawing Sheets

(56) References Cited

FOREIGN PATENT DOCUMENTS

| | | | |
|---|---|---|---|
| JP | 2013086186 A | | 5/2013 |
| JP | 2014042965 A | * | 3/2014 |
| JP | 2014042965 A | | 3/2014 |
| JP | 2015085439 A | | 5/2015 |
| JP | 2015-196580 A | | 11/2015 |
| JP | 2016183451 A | | 10/2016 |
| JP | 2017047481 A | | 3/2017 |
| WO | 2013/087554 A1 | | 6/2013 |

OTHER PUBLICATIONS

English Translation for JP2014042965 (Year: 2014).*
Notification of Transmittal of Translation of the International Preliminary Report on Patentability and Translation of Written Opinion of the International Searching Authority; PCT/JP2019/006633; dated Oct. 1, 2020.
International Search Report issued in PCT/JP2019/006633; dated May 21, 2019.

* cited by examiner

ARTICLE TRANSFER DEVICE

TECHNICAL FIELD

The present disclosure relates to an article transfer device.

BACKGROUND ART

An article transfer device grips an article such as food accommodated in a container with a robot hand and transfers the article at the gripping part to another container or the like. A robot hand used for such article transfer devices is described in, for example, Patent Literature 1.

CITATION LIST

Patent Literature

Patent Literature 1: Japanese Unexamined Patent Publication No. 2017-47481

SUMMARY OF INVENTION

Technical Problem

Regarding such article transfer devices, it is conceivable that the robot hand is incapable of stably gripping the article and the article partially drops during the article transfer depending on the type of the article.

In this regard, an object of the present disclosure is to provide an article transfer device capable of stably gripping an article.

Solution to Problem

An article transfer device according to the present disclosure includes a robot hand having a gripping unit gripping an article and transferring the article gripped by the gripping unit to a transfer destination and a control unit controlling operation of the robot hand so as to insert the gripping unit into an article region where a plurality of the articles are disposed, grip a predetermined amount of the article, and transfer the gripped article to the transfer destination. The control unit controls the operation of the robot hand such that the gripping unit is closed and the predetermined amount of the article is gripped after opening-closing operation for opening the gripping unit after temporarily closing the gripping unit is executed at least once at a position of the gripping unit at a time when the gripping unit is inserted in the article region.

The article transfer device performs the opening-closing operation of the gripping unit at least once with the gripping unit inserted in the article region where the plurality of articles are disposed and then grips the article by closing the gripping unit. In other words, the article transfer device temporarily collects the predetermined amount of the article to be gripped by the opening-closing operation of the gripping unit and then grips the collected article. In this manner, the article that is collected is gripped by the gripping unit, and thus the article transfer device is capable of stably gripping the article by means of the gripping unit.

In the article transfer device, the control unit may control the operation of the robot hand such that the gripping unit rotates by a predetermined first angle around an axis along a direction of insertion of the gripping unit during the temporary closing, the subsequent opening, and subsequent reclosing of the gripping unit at the position of the gripping unit at the time when the gripping unit is inserted in the article region. In this case, the article transfer device is capable of collecting or gripping the article to be gripped by abutting against the predetermined amount of the article to be gripped from a direction different from the direction at the time of the previous closing of the gripping unit. In this manner, the gripping unit collects or grips the article from different directions, and thus the article transfer device is capable of further collecting and more stably gripping the article.

In the article transfer device, the control unit may control the operation of the robot hand such that the gripping unit rotates by a predetermined second angle around an axis along a direction of insertion of the gripping unit when the gripping unit remains closed at the position of the gripping unit at the time when the gripping unit is inserted in the article region. In this case, the article transfer device rotates the gripping unit in a state where the article as a part of the plurality of articles is gripped, and thus it is possible to separate the article gripped by the gripping unit from the surrounding article (article that is not to be gripped). As a result, the article transfer device is capable of stably gripping the predetermined amount of the article to be gripped.

In the article transfer device, the control unit may control the operation of the robot hand such that an opening amount at the time when the gripping unit is opened after the gripping unit is temporarily closed with the gripping unit inserted in the article region is smaller than the opening amount of the gripping unit at the time when the gripping unit is inserted into the article region. In this case, the article transfer device is capable of shortening the time for the operation of opening the gripping unit and quickly gripping the article.

In the article transfer device, the control unit may control the operation of the robot hand so as to continuously execute a plurality of times the serial operation of closing the gripping unit, gripping the predetermined amount of the article, and transferring the article to the transfer destination after executing at least once the opening-closing operation of inserting the gripping unit into the article region, temporarily closing the gripping unit, and then opening the gripping unit. In this case, the article transfer device is capable of sequentially transferring the predetermined amount of the article from the plurality of articles in the article region to the transfer destination.

Advantageous Effects of Invention

An article can be stably gripped according to the article transfer device of the present disclosure.

DESCRIPTION OF EMBODIMENTS

Hereinafter, an embodiment of the present disclosure will be described with reference to the drawings. It should be noted that the same elements in the description of the drawings will be denoted by the same reference symbols without redundant description. The terms "upper" and "lower" correspond to the "upper" and "lower" sides in a vertical direction, respectively.

Figure 1:
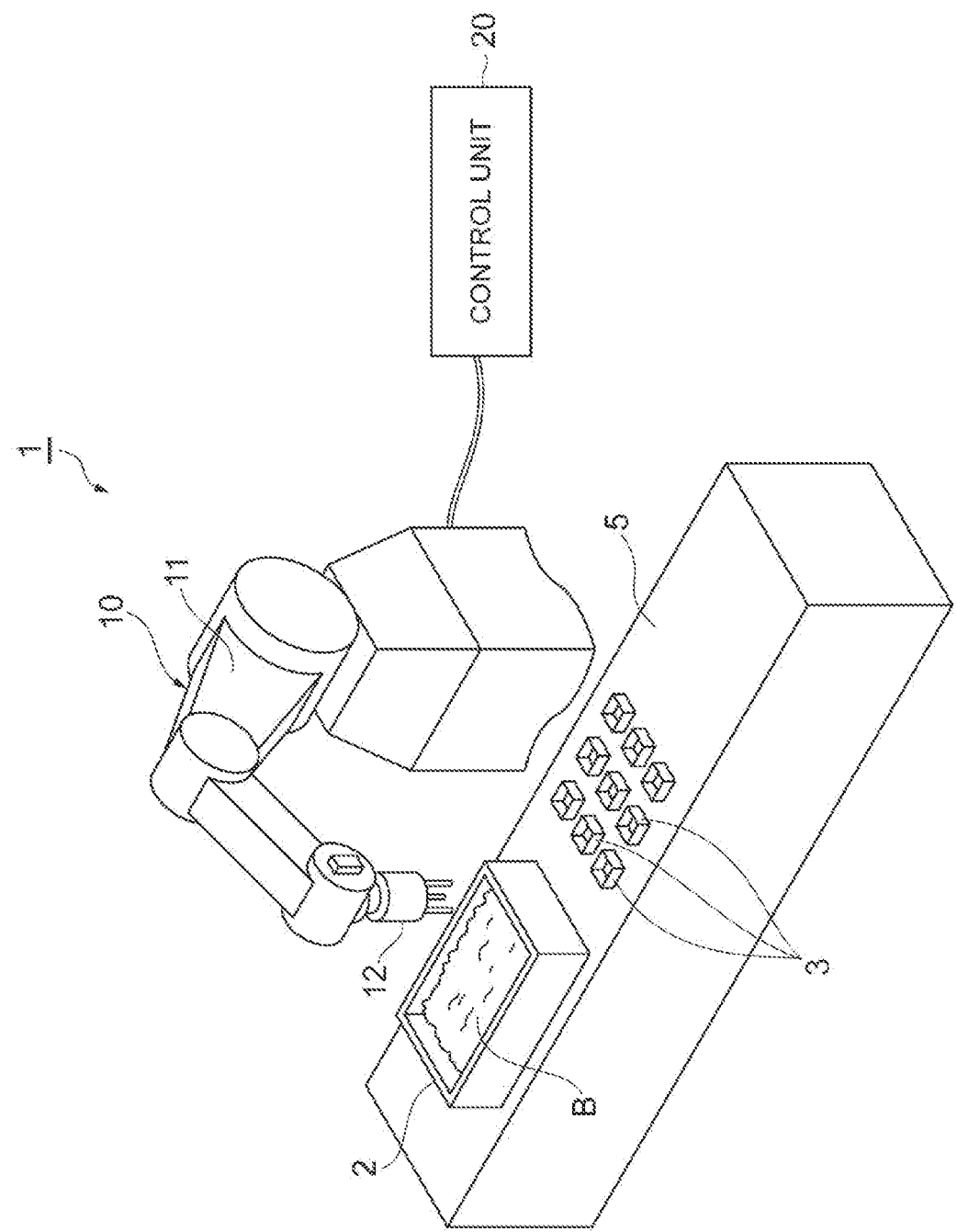
FIG. 1 is a diagram illustrating a schematic configuration of an article transfer device according to an embodiment.

As illustrated in FIG. 1, a food material group B, which is an aggregate of a plurality of food materials (articles) B1 (see FIG. 3), is accommodated (disposed) in a tray 2. An article transfer device 1 takes out a predetermined amount of the food material B1 from the inside of the tray 2 and transfers the food material B1 to a container 3 such as a lunch case. Specifically, the article transfer device 1 includes a robot hand 10 and a control unit 20.

The robot hand 10 is provided near the container 3 and the tray 2 placed on a workbench 5. A plurality of the containers 3 are disposed on the workbench 5. Each of the tray 2 and the container 3 is a box body having an open upper portion. The robot hand 10 takes out a target gripping amount (predetermined amount) of the food material B1 from the tray 2 and sequentially transfers the food material B1 to the plurality of containers 3. The robot hand 10 includes an arm portion 11 and a gripping unit 12.

The gripping unit 12 is attached to the tip portion of the arm portion 11. The arm portion 11 has a plurality of joints. The arm portion 11 is capable of moving the gripping unit 12 to a desired position by turning and bending the joint. The operation of the arm portion 11 is controlled by the control unit 20. The arm portion 11 operates based on a control signal output from the control unit 20.

Figure 2:
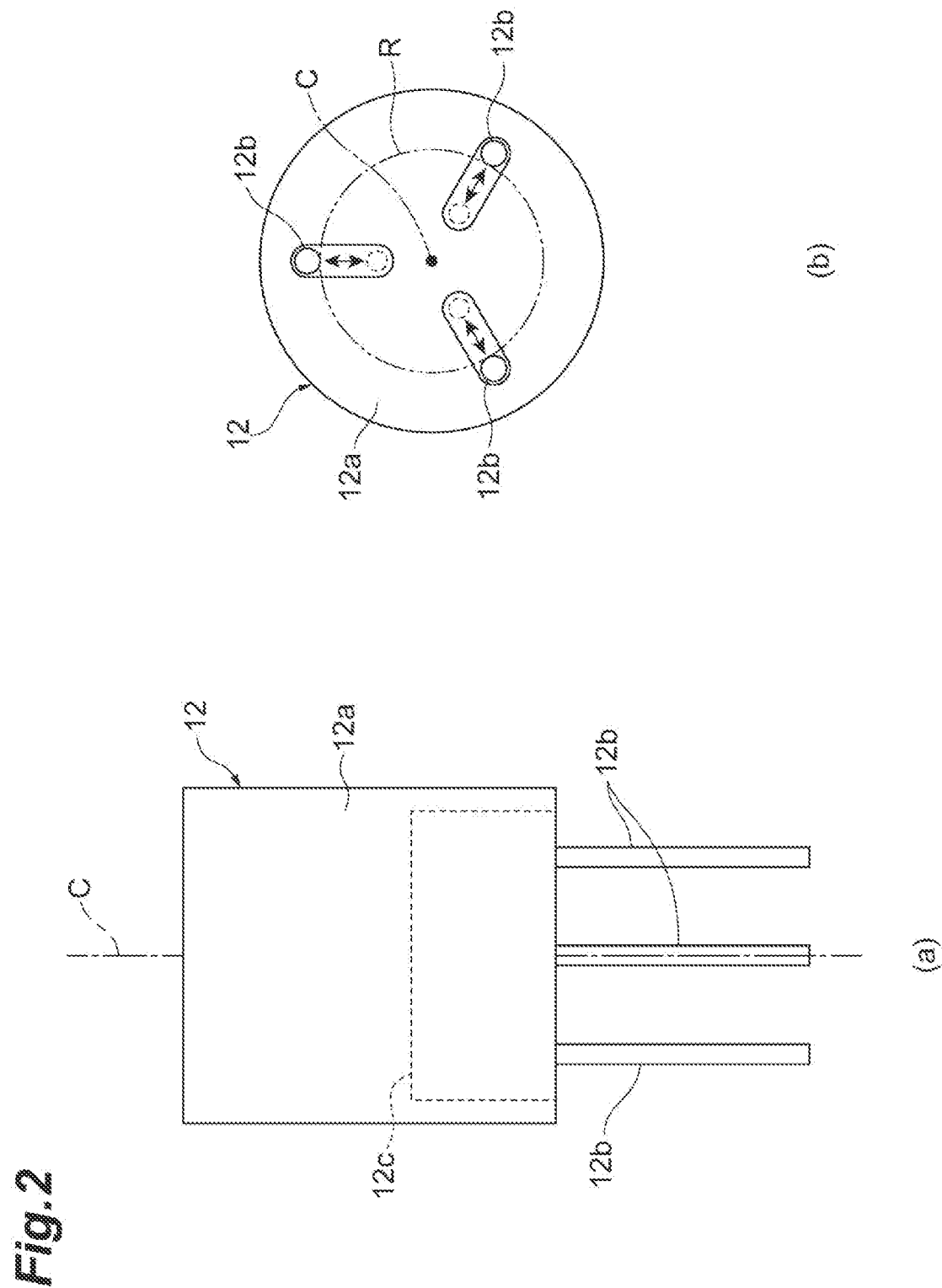
FIG. 2(a) is a side view of a gripping unit.
FIG. 2(b) is a diagram in which the gripping unit is viewed from below.

The gripping unit 12 grips a part of the food material B1 from the food material group B. In the present embodiment, the gripping unit 12 includes a main body portion 12a, three gripping members 12b, and a drive unit 12c as illustrated in FIGS. 2(a) and 2(b). The main body portion 12a is a housing having a central axis C. The main body portion 12a has, for example, a columnar outer shape. The main body portion 12a is formed of, for example, metal. The main body portion 12a is attached to the tip portion of the arm portion 11.

The gripping member 12b is a rod-shaped member. The gripping member 12b is formed of, for example, resin, metal, or the like. The gripping member 12b is attached to the main body portion 12a so as to protrude downward from the main body portion 12a. Each of the three gripping members 12b is disposed on a virtual circle about the central axis C. The three gripping members 12b are disposed at equal intervals (120° intervals) in the circumferential direction of the virtual circle.

In addition, the gripping member 12b is movably provided on the main body portion 12a. Specifically, the gripping member 12b moves by being driven by the drive unit 12c. The drive unit 12c moves the gripping member 12b in a direction toward the central axis C and a direction away from the central axis C. The drive unit 12c moves the three gripping members 12b in synchronization. As a result, the three gripping members 12b move in a direction toward each other and a direction away from each other. The drive unit 12c is configured to include, for example, a motor and a link mechanism. The operation of the drive unit 12c is controlled by the control unit 20. The drive unit 12c operates based on a control signal output from the control unit 20.

Figure 3:
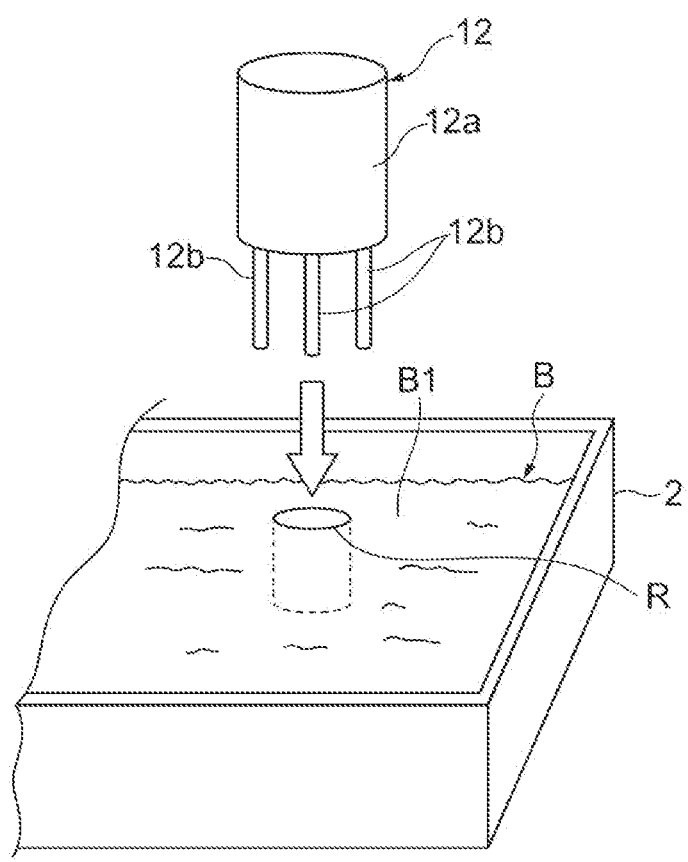
FIG. 3 is a diagram illustrating how the gripping unit is inserted into a food material group.

As illustrated in FIG. 3, the gripping member 12b of the gripping unit 12 is inserted into the food material group B by the arm portion 11 moving the gripping unit 12 from the upper side to the lower side along the vertical direction. In other words, the direction of insertion of the gripping unit 12 into the food material group B coincides with the vertical direction. It should be noted that the inclination of the gripping unit 12 is adjusted by the arm portion 11 such that the direction of extension of the central axis C coincides with the vertical direction when the gripping unit 12 is inserted into the food material group B. Subsequently, the drive unit 12c moves the three gripping members 12b in a direction toward each other. As a result, the gripping unit 12 grips the food material B1 positioned inside an inscribed circle R (see FIG. 2(b)) inscribed in the three gripping members 12b.

The gripping amount of the food material B1 gripped by the gripping unit 12 (mass of the gripped food material B1) is determined by the insertion depth of the gripping member 12b inserted into the food material group B and the opening amount of the three gripping members 12b at the time when the gripping member 12b is inserted into the food material group B. The gripping unit 12 is capable of gripping an increasing amount of the food material B1 as the insertion depth of the gripping member 12b into the food material group B increases. The gripping unit 12 is capable of gripping an increasing amount of the food material B1 as the opening amount of the three gripping members 12b increases.

The robot hand 10 grips a part of the food material B1 from the food material group B by inserting the gripping member 12b of the gripping unit 12 into the food material group B in the tray 2. Subsequently, the robot hand 10 moves the gripping unit 12 to above the container 3, which is a transfer destination, by operating the arm portion 11. Then, the robot hand 10 is capable of transferring the gripped food material B1 to the container 3 as a transfer destination by releasing the food material B1 from the gripping unit 12.

The control unit 20 controls the operation of the robot hand 10. The control unit 20 may be accommodated in the robot hand 10 or may be provided outside the robot hand 10. The control unit 20 is an electronic control unit having a central processing unit (CPU), a read only memory (ROM), a random access memory (RAM), and the like. The control unit 20 controls the operation of the robot hand 10 by outputting a control signal to the robot hand 10.

Specifically, the control unit 20 controls the operation of the robot hand 10 such that a predetermined amount of the food material B1 is gripped by the gripping member 12b being inserted into the food material group B in the tray 2 (article region where the food material B1 is placed) and the gripped food material B1 is transferred to the container 3 as a transfer destination. At this time, the control unit 20 controls the insertion depth and the opening amount at the time when the gripping member 12b is inserted into the food material group B such that a predetermined amount of the food material B1 is gripped by the gripping unit 12 as described above.

Here, the control unit 20 executes opening-closing operation for opening the gripping member 12b after temporarily closing the three gripping members 12b at the position of the gripping unit 12 (main body portion 12a) at the time when the gripping member 12b is inserted in the food material group B at least once. The opening-closing operation is to temporarily close the three gripping members 12b and then open the gripping member 12b. Then, after the opening-closing operation of the gripping member 12b, the control unit 20 controls the operation of the robot hand 10 such that the gripping member 12b is closed and a predetermined amount of the food material B1 is gripped.

More specifically, the control unit 20 determines the insertion depth and the opening amount at a time when the gripping member 12b is inserted into the food material group B such that a predetermined amount of the food material B1 can be gripped. The control unit 20 controls the operation of the gripping unit 12 such that the determined opening amount of the gripping member 12b is reached. Subsequently, as illustrated in FIG. 4(a), the control unit 20 controls the operation of the robot hand 10 such that the gripping member 12b is inserted by the determined insertion depth into the food material group B.

Figure 4:
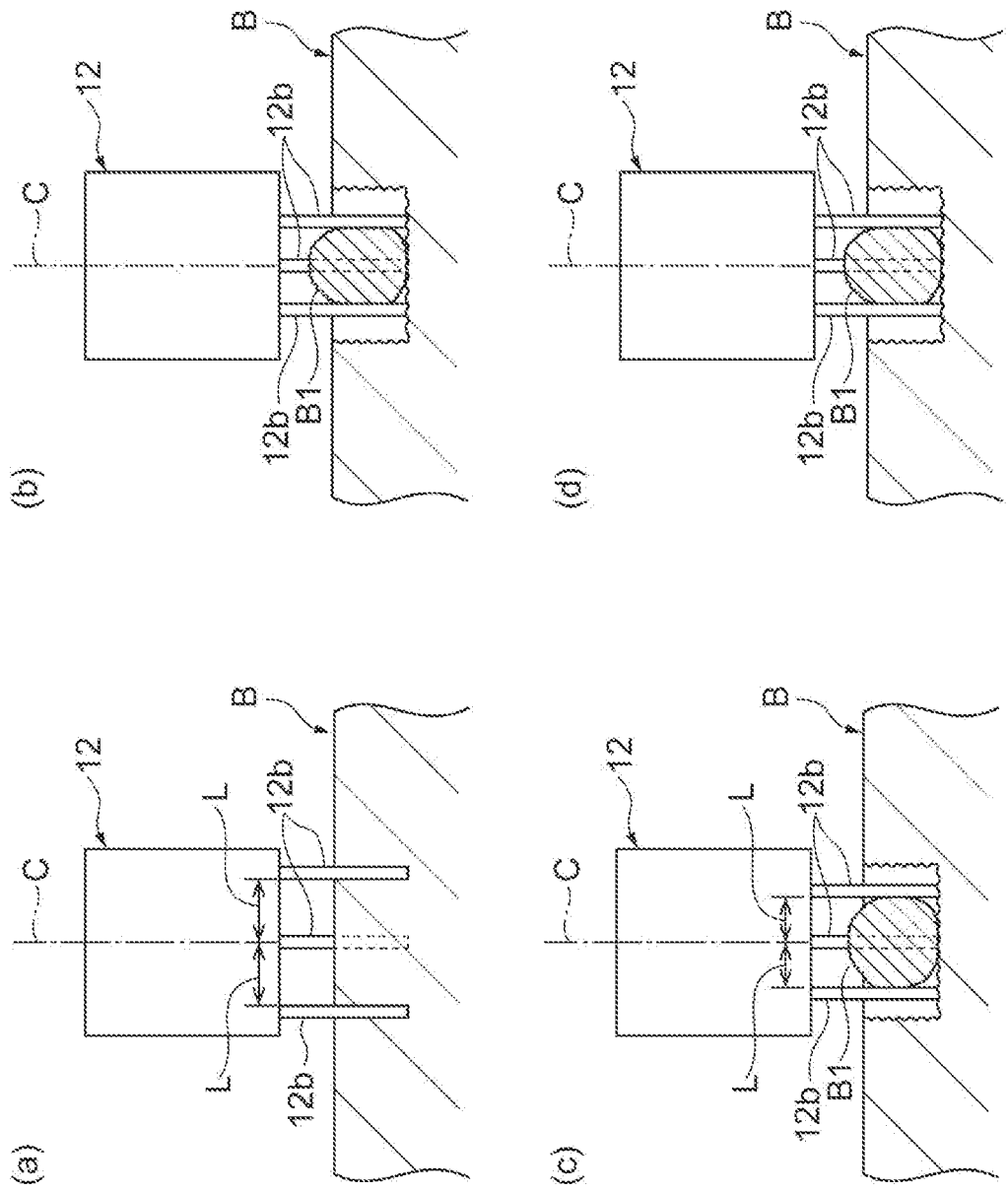
FIG. 4(a) is a diagram illustrating a state where a gripping member is inserted in the food material group.
FIG. 4(b) is a diagram illustrating a state where the gripping member is temporarily closed in preliminary operation.
FIG. 4(c) is a diagram illustrating a state where the gripping member is opened in the preliminary operation.
FIG. 4(d) is a diagram illustrating a state where the gripping member is closed in gripping operation.

After the gripping member 12b is inserted into the food material group B, the control unit 20 controls the operation of the gripping unit 12 so as to temporarily close the three gripping members 12b as illustrated in FIG. 4(b). As a result, a predetermined amount of the food material B1 positioned inside the three gripping members 12b is separated from the surrounding food material B1 and collected together. Then, as illustrated in FIG. 4(c), the control unit 20 controls the operation of the gripping unit 12 such that the gripping member 12b is opened again.

It should be noted that the control unit 20 controls the operation of the gripping unit 12 such that the opening amount at a time when the gripping member 12b is opened after the gripping member 12b is temporarily closed with the gripping member 12b inserted in the food material group B is smaller than the opening amount of the gripping member 12b at a time when the gripping member 12b is inserted into the food material group B. In other words, the control unit 20 controls the operation of the gripping unit 12 such that the opening amount at a time when the gripping member 12b is reopened as illustrated in FIG. 4(c) is smaller than the opening amount of the gripping member 12b at a time when the gripping member 12b is inserted into the food material group B as illustrated in FIG. 4(a). In FIG. 4(c), a length L (opening amount) from the central axis C to the gripping member 12b is shorter than the length L that is illustrated in FIG. 4(a).

At the position of the gripping unit 12 at a time when the gripping member 12b is inserted in the food material group B, the control unit 20 causes the gripping unit 12 to execute the opening-closing operation for opening the gripping member 12b after temporarily closing the three gripping members 12b as illustrated in FIGS. 4(b) and 4(c) at least once. Hereinafter, the opening-closing operation for opening the gripping member 2b after temporarily closing the gripping member 12b as illustrated in FIGS. 4(b) and 4(c) will be referred to as "preliminary operation". The control unit 20 causes the gripping unit 12 to execute the preliminary operation illustrated in FIGS. 4(b) and 4(c) at least once. In other words, the gripping unit 12 collects the food material B1 by the preliminary operation.

After the preliminary operation of the gripping member 12b, the control unit 20 controls the gripping unit 12 such that the gripping member 12b is closed and the food material B1 is gripped as illustrated in FIG. 4(d). Subsequently, the control unit 20 controls the operation of the robot hand 10 such that the gripped food material B1 is transferred to the container 3 as a transfer destination. Hereinafter, the operation of closing the gripping member 12b and gripping the food material B1 in order to transfer the food material B1 to the transfer destination as illustrated in FIG. 4(d) will be referred to as "gripping operation".

Figure 5:
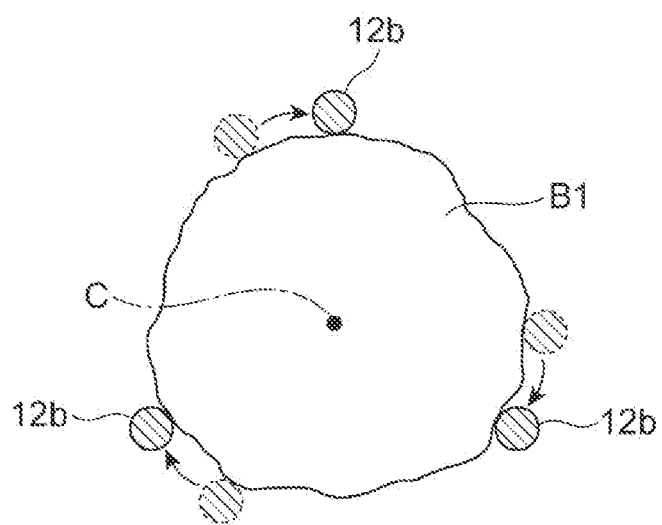
FIG. 5 is a diagram illustrating how a food material gripping position changes by the gripping unit being rotated.

Here, at the position of the gripping unit 12 at a time when the gripping member 12b is inserted in the food material group B, the control unit 20 controls the operation of the robot hand 10 such that the gripping unit 12 rotates by a predetermined first angle around the central axis C (around an axis along the direction of insertion of the gripping unit 12) during the temporary closing, subsequent opening, and subsequent reclosing of the gripping member 12b. In other words, as illustrated in FIG. 5, the control unit 20 changes the position where the gripping member 12b grips the food material B1 when the gripping member 12b is closed by rotating the gripping unit 12 by the first angle.

It should be noted that the control unit 20 may rotate the gripping unit 12 by the first angle each time the gripping member 12b is closed during the preliminary operation in a case where the preliminary operation illustrated in FIGS. 4(b) and 4(c) is executed a plurality of times. In addition, the control unit 20 may rotate the gripping unit 12 by the first angle between the closing of the gripping member 12b in the preliminary operation and the closing of the gripping member 12b in the gripping operation.

In addition, at the position of the gripping unit 12 at a time when the gripping member 12b is inserted in the food material group B, the control unit 20 controls the operation of the robot hand 10 such that the gripping unit 12 rotates by a predetermined second angle around the central axis C when the gripping member 12b remains closed. In other words, the control unit 20 rotates the entire gripping unit 12 by the second angle with the gripping member 12b closed.

It should be noted that the control unit 20 may rotate the gripping unit 12 by the second angle when the gripping member 12b remains closed in the preliminary operation as illustrated in FIG. 4(b). In addition, as illustrated in FIG. 4(d), the control unit 20 may rotate the gripping unit 12 by the second angle when the gripping member 12b remains closed in the gripping operation. It should be noted that the second angle may be equal to or different from the first angle.

The food material B1 is sequentially transferred to the plurality of containers 3 by the control unit 20 controlling the operation of the robot hand 10 such that the serial operation described with reference to FIGS. 4(a) to 4(d) is repeatedly executed. In other words, the control unit 20 controls the operation of the robot hand 10 so as to continuously execute a plurality of times the serial operation in which the gripping member 12b is closed and a predetermined amount of the food material B1 is gripped after the opening-closing operation (preliminary operation) in which the gripping member 12b is inserted into the food material group B, temporarily closed, and then opened is executed at least once.

As described above, the article transfer device 1 performs the opening-closing operation (preliminary operation) of the gripping member 12b at least once with the gripping member 12b inserted in the food material group B and then grips the food material B1 by closing the gripping member 12b. In other words, the article transfer device 1 temporarily collects a predetermined amount of the food material B1 to be gripped by the opening-closing operation of the gripping member 12b and then grips the collected food material B1. In this manner, the food material B1 that is collected is gripped by the gripping member 12b, and thus the article transfer device 1 is capable of stably gripping the food material B1 by means of the gripping unit 12.

The article transfer device 1 rotates the gripping unit 12 by the first angle around the central axis C during the temporary closing, subsequent opening, and subsequent reclosing of the gripping member 12b. In this case, the article transfer device 1 is capable of collecting or gripping the food material B1 by abutting of the gripping member 12b against a predetermined amount of the food material B1 to be gripped from a direction different from the direction at the time of the previous closing. In this manner, the gripping member 12b collects or grips the food material B1 from different directions, and thus the article transfer device 1 is capable of further collecting and more stably gripping the food material B1.

With the gripping member 12b closed, the article transfer device 1 rotates the gripping unit 12 by the second angle around the central axis C. In this manner, the article transfer device 1 rotates the gripping unit 12 in a state where the food material B1 as a part of the food material group B is gripped, and thus it is possible to separate the food material B1 gripped by the gripping member 12b from the surrounding food material B1 (food material B1 that is not to be gripped). As a result, the article transfer device 1 is capable of stably gripping a predetermined amount of the food material B1 to be gripped.

The control unit 20 controls the operation of the gripping unit 12 such that the opening amount at a time when the gripping member 12b is opened after the gripping member 12b is temporarily closed with the gripping member 12b inserted in the food material group B is smaller than the opening amount of the gripping member 12b at a time when the gripping member 12b is inserted into the food material group B. In this case, the article transfer device 1 is capable of shortening the time for the operation of opening the gripping member 12b and quickly gripping the food material B1.

In the article transfer device 1, the serial operation in which the gripping member 12b is closed, a predetermined amount of the food material B1 is gripped, and the food material B1 is transferred to the transfer destination after the preliminary operation of the gripping member 12b is executed at least once with the gripping member 12b inserted in the food material group B is continuously executed a plurality of times. In this case, the article transfer device 1 is capable of sequentially transferring a predetermined amount of the food material B1 from the food material group B to the plurality of containers 3 as a transfer destination.

Although an embodiment of the present disclosure has been described above, the present disclosure is not limited to the above embodiment. For example, a form in which the gripping unit 12 has the three gripping members 12b has been described as an example in the above-described embodiment. However, the gripping unit 12 may have at least two gripping members. The gripping unit 12 may have any configuration insofar as the food material B1 is gripped by means of the configuration.

In the above embodiment, the article transfer device 1 grips the food material B1 in the tray 2 and transfers the food material B1 to the container 3. However, the article transfer device 1 is capable of transferring various articles other than the food material B1 as transfer targets. In addition, the article transfer device 1 is not limited to transferring the food material B1 from the tray 2 to the container 3 and may be used for various purposes.

In addition, the robot hand 10 is not limited to the configuration in which the gripping unit 12 is moved in both the horizontal direction and the vertical direction. For example, the arm portion 11 of the robot hand 10 may be configured to move the gripping unit 12 only in the vertical direction and rotate the gripping unit 12 around an axis along the vertical direction. In this case, the article transfer device 1 includes a transport device alternately transporting the tray 2 that accommodates the food material group B and the container 3 that is empty to a position below the gripping unit 12. The robot hand 10 lowers the gripping unit 12 toward the tray 2 transported to the position below the gripping unit 12, grips the food material B1, and raises the gripping unit 12. Then, the robot hand 10 is capable of transferring the food material B1 by lowering the gripping unit 12 toward the empty container 3 transported to the position below the gripping unit 12 and dropping the food material B1 into the container 3.

In addition, a force (torque of the drive unit 12c) at a time when the gripping member 12b is closed and the food material B1 is gripped may be preset in the gripping unit 12. In this case, the gripping unit 12 moves the gripping member 12b to a position where the gripping member 12b can be closed by the preset force. In other words, the gripping unit 12 may stop the operation of closing the gripping member 12b before the gripping member 12b reaches a target closing position depending on the gripping state of the food material B1. Thereby, the gripping unit 12 is capable of suppressing damage to the food material B1 when the gripping member 12b is closed and the food material B1 is gripped.

INDUSTRIAL APPLICABILITY

It is possible to provide an article transfer device capable of stably gripping an article.

REFERENCE SIGNS LIST

1: article transfer device, 3: container (transfer destination), 10: robot hand, 12: gripping unit, 20: control unit, B1: food material (article).

The invention claimed is:

1. An article transfer device comprising:
a robot hand having a gripping unit gripping an article and transferring the article gripped by the gripping unit to a transfer destination, the gripping unit including a plurality of rod-shaped gripping members; and
a processor controlling operation of the robot hand so as to insert the gripping unit into an article region where a plurality of the articles are disposed, grip a predetermined amount of the articles, and transfer the gripped articles to the transfer destination,
wherein the processor controls the operation of the robot hand to close the gripping unit to grip the predetermined amount of the articles after executing at least once an opening-closing operation of temporarily closing the gripping unit, and then to open the gripping unit at a position of the gripping unit when the gripping unit is inserted in the article region, and
wherein the opening-closing operation separates the articles located in the gripping unit from the articles located around the gripping unit and gathers the articles located in the gripping unit.

2. The article transfer device according to claim 1, wherein the processor controls the operation of the robot hand such that the gripping unit rotates by a predetermined first angle around an axis along a direction of insertion of the gripping unit when the gripping unit is being opened after the temporary closing and before subsequent reclosing at the position of the gripping unit when the gripping unit is inserted in the article region.

3. The article transfer device according to claim 1, wherein the processor controls the operation of the robot hand such that the gripping unit rotates by a predetermined second angle around an axis along a direction of insertion of the gripping unit when the gripping unit remains closed at the position of the gripping unit when the gripping unit is inserted in the article region.

4. The article transfer device according to claim 1, wherein the processor controls the operation of the robot hand such that an opening amount when the gripping unit is opened after the gripping unit is temporarily closed with the gripping unit inserted in the article region is smaller than the opening amount of the gripping unit when the gripping unit is inserted into the article region.

5. The article transfer device according to claim 1, wherein the processor controls the operation of the robot hand so as to continuously execute a plurality of times serial operation of closing the gripping unit, gripping the predetermined amount of the articles, and transferring the article to the transfer destination after executing at least once the opening-closing operation of inserting the gripping unit into the article region, temporarily closing the gripping unit, and then opening the gripping unit.

\* \* \* \* \*